(12) United States Patent  
Cook, Jr. et al.

(10) Patent No.: US 6,677,538 B2
(45) Date of Patent: Jan. 13, 2004

(54) SIGNAL PROCESSING IN A VEHICLE WEIGHT CLASSIFICATION SYSTEM

(75) Inventors: Charles R. Cook, Jr., Rochester, MI (US); Daniel Reich, Macomb, MI (US); Scott Morell, White Lake Township, MI (US); Horst Belau, Langquaid (DE); Marten Swart, Obertraubling (DE); Harald Lichtinger, Auburn Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 330 days.

(21) Appl. No.: 09/791,428

(22) Filed: Feb. 23, 2001

(65) Prior Publication Data

US 2001/0025730 A1 Oct. 4, 2001

Related U.S. Application Data

(60) Provisional application No. 60/184,947, filed on Feb. 25, 2000.

(51) Int. Cl.[7] .......................... B60K 28/04; G01G 19/34
(52) U.S. Cl. ................. 177/25.13; 177/144; 177/185; 280/735; 180/273; 701/45; 73/862.622; 73/862.627
(58) Field of Search ................ 280/735; 180/273; 701/45; 177/25.11–25.13, 136, 144, 185; 73/862.622, 862.627, 862.628

(56) References Cited

U.S. PATENT DOCUMENTS

| | | | |
|---|---|---|---|
| 4,075,443 A | | 2/1978 | Fatur |
| 4,380,175 A | * | 4/1983 | Griffen .................. 177/211 |
| 4,556,115 A | * | 12/1985 | Lockery et al. ............ 177/211 |
| RE32,631 E | * | 3/1988 | Layer ..................... 177/211 |
| 4,747,456 A | * | 5/1988 | Kitagawa et al. ........... 177/211 |
| 4,796,212 A | * | 1/1989 | Kitagawa ................ 177/25.11 |
| 4,817,026 A | * | 3/1989 | Inoue et al. ............... 177/185 |
| 5,232,243 A | | 8/1993 | Blackburn et al. |
| 5,254,992 A | * | 10/1993 | Keen et al. .............. 177/210 R |
| 5,345,042 A | * | 9/1994 | Jamieson ................ 177/25.13 |
| 5,369,226 A | * | 11/1994 | Griffen et al. ............. 177/211 |
| 5,413,378 A | | 5/1995 | Steffens, Jr. et al. |
| 5,431,447 A | | 7/1995 | Bauer |
| 5,454,591 A | | 10/1995 | Mazur et al. |
| 5,481,078 A | | 1/1996 | Asche |
| 5,566,978 A | | 10/1996 | Fleming et al. |
| 5,573,269 A | | 11/1996 | Gentry et al. |
| 5,605,348 A | | 2/1997 | Blackburn et al. |
| 5,624,132 A | | 4/1997 | Blackburn et al. |
| 5,626,359 A | | 5/1997 | Steffens, Jr. et al. |
| 5,664,807 A | | 9/1997 | Böhmler |
| 5,670,853 A | | 9/1997 | Bauer |
| 5,732,375 A | | 3/1998 | Cashler |
| 5,864,295 A | | 1/1999 | Jarocha |
| 5,906,393 A | | 5/1999 | Mazur et al. |
| 6,040,532 A | | 3/2000 | Munch |
| 6,079,745 A | | 6/2000 | Wier |
| 6,087,598 A | | 7/2000 | Munch |
| 6,147,312 A | * | 11/2000 | Lockery .................. 177/211 |
| 6,179,330 B1 | | 1/2001 | Wier |

FOREIGN PATENT DOCUMENTS

| | | |
|---|---|---|
| DE | 19754166 | 6/1999 |
| WO | 9849031 | 11/1998 |
| WO | 9924285 | 5/1999 |

* cited by examiner

Primary Examiner—Randy Gibson

(57) ABSTRACT

A vehicle weight classification system recognizes the various factors that influence system performance. Some of the factors are compensated for using analog signal processing circuitry or techniques. Other factors are compensated for using digital signal processing techniques. The unique combination of analog and digital approaches, rather than pure analog or pure digital, provides an effective solution at addressing the various factors that influence signals and system performance in a vehicle weight classification system while keeping the cost and complexity of the system within acceptable limits.

6 Claims, 3 Drawing Sheets

SIGNAL PROCESSING IN A VEHICLE WEIGHT CLASSIFICATION SYSTEM

RELATED APPLICATIONS

This application claims priority to U.S. Provisional application No. 60/184,947, which was filed on Feb. 25, 2000.

BACKGROUND OF THE INVENTION

In general terms, this invention relates to vehicle weight classification systems for classifying the weight of an occupant on a vehicle seat. More particularly, this invention relates to a signal processing system and method for handling sensor signals used in a vehicle weight classification system.

Contemporary vehicles typically include safety restraints to protect passengers and drivers during impact. Such restraints include seatbelts and airbags, for example. It has recently become apparent that customized control of airbags is desirable. The owner of this application has developed a weight classification system that is useful for determining the size or weight of a seat occupant and controlling an airbag deployment responsive to that determination.

One of the challenges in designing a weight classification system is keeping the system simple and robust. In order to do so, choices must be made regarding the types of components utilized as sensors and signal processing, for example. There are competing concerns between system performance (i.e., accuracy), cost and durability of the system components. These various factors present complicating and sometimes competing interests for designing such a system.

In addition to the system constraints, there are a variety of factors that must be accounted for when operating a weight classification system. Certain factors affect the performance of the system. Such factors include for example, temperature, sensor offset, signal strengths and the capabilities of the various components used in the system. There is a need for a way of addressing the various issues that must be compensated for when operating a weight classification system.

This invention provides a unique approach to addressing the various influences on the operation of a weight classification system.

SUMMARY OF THE INVENTION

In general terms, this invention is a system for compensating for various factors that influence the operation of a vehicle weight classification system. This invention includes the identification of various factors that must be compensated for in handling signals in a weight classification system. Some of these factors are compensated for using analog signal processing techniques. Other factors are compensated for using digital signal processing techniques. The combination of analog and digital approaches provides a solution that adequately addresses the various and different concerns raised when operating a weight classification system while keeping the system cost and complexity within acceptable limits.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
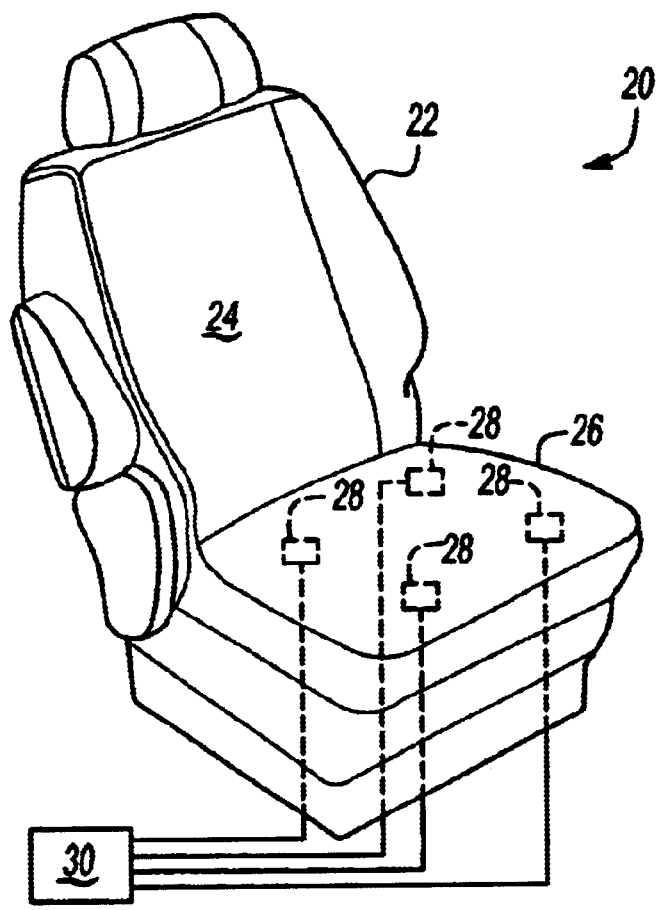
FIG. 1 diagrammatically illustrates a weight classification system designed according to this invention.
Figure 2:
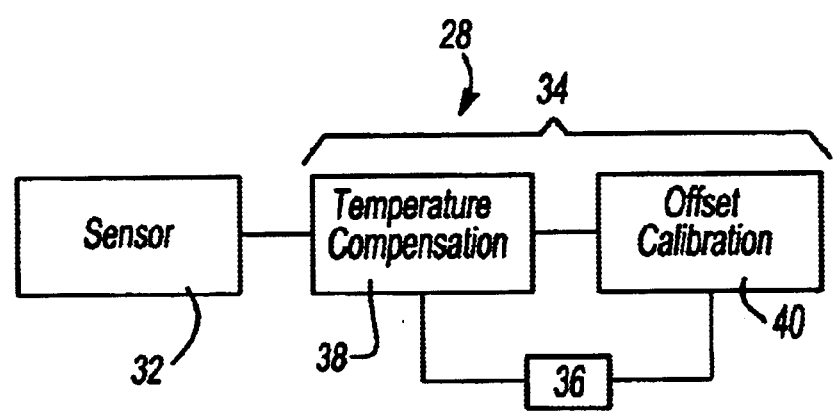
FIG. 2 schematically illustrates a portion of the system of FIG. 1.

A vehicle weight classification system 20 is used for determining the weight of an occupant of a seat 22 in a vehicle. The seat includes a seat back 24 and a seat base 26. A plurality of sensor assemblies 28 preferably are supported relative to the seat base 26 so that the weight of a seat occupant can be determined. Each of the sensor assemblies 28 preferably communicates with a supplemental restraint controller 30, which is an airbag firing controller in one example.

Each of the sensor assemblies 28 preferably includes a sensor 32 that generates an electrical signal indicative of the weight of the seat occupant. In one example, the sensors 32 are strain gauge sensors. Because strain gauge sensors are used as an example, some of the factors affecting the operation of the weight classification system that are described in this specification are those typically encountered when using a strain gauge sensor, such as offset calibration.

Each sensor assembly 28 preferably includes a signal conditioning portion 34 that addresses the various factors that affect the operation of the system or the effectiveness of the sensor signal.

Part of this invention is identifying the various factors that must be addressed to insure the best possible system operation. These factors include sensor offset, sensor temperature correction, circuitry offset, circuitry temperature correction, seat parameters, vehicle parameters, and spread in the sensor signal strength. These are example factors that affect the operation of the system and that are preferably compensated for in a system designed according to this invention. Not all of these factors must be accounted for in all situations. It is preferred to identify those which have the greatest impact on the system operation and address those most effectively while possibly addressing the others depending on the needs of a particular situation. Those skilled in the art who have the benefit of this description will be able to determine what factors must be accounted for in their own situation. The approach of this invention may be applied in a variety of circumstances to address a variety of factors that must be compensated for.

Figure 3:
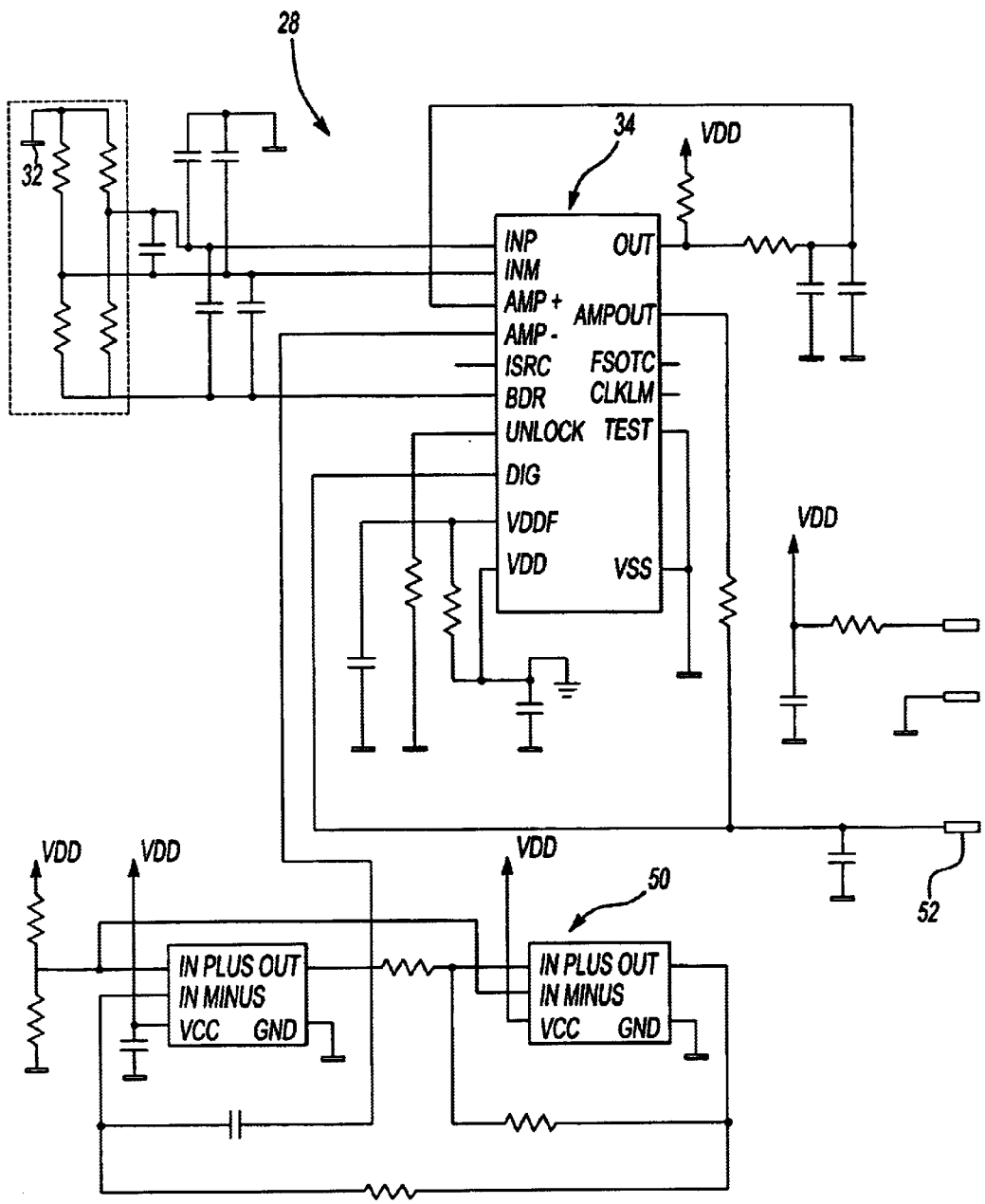
FIG. 3 schematically illustrates a circuit designed according to this invention.

One example signal conditioning module 34 is shown in FIG. 3 as an integrated circuit chip. An example, commercially available such chip is known as the MAX1452 chip available from Maxim.

The signal conditioning module 34 preferably includes a microcontroller 36 that communicates with a temperature compensation module 38 and an offset calibration module 40. Temperature compensation and offset calibration are used as examples because they are two of the primary factors affecting system performance.

In the illustrated example the temperature compensation module 38 and the offset calibration module 40 preferably are analog signal processing portions. The microcontroller 36 preferably obtains information from the signals provided by the temperature compensation module 38 and the offset calibration module 40 to make a determination on how to calibrate the system or compensate for influences on the received signals from the sensors 32. A memory portion 42 preferably includes a variety of data that enables the micro controller 36 to make temperature corrections or sensor offset corrections, for example. Those skilled in the art who have the benefit of this description will be able to determine the types of information to be stored in such memory so that the micro controller 36 can make appropriate determinations and corrections to the sensor signals. The micro controller 36 preferably communicates through a serial interface 44 to provide a digitized output 46 to the supplemental restraint controller 30.

Figure 4:
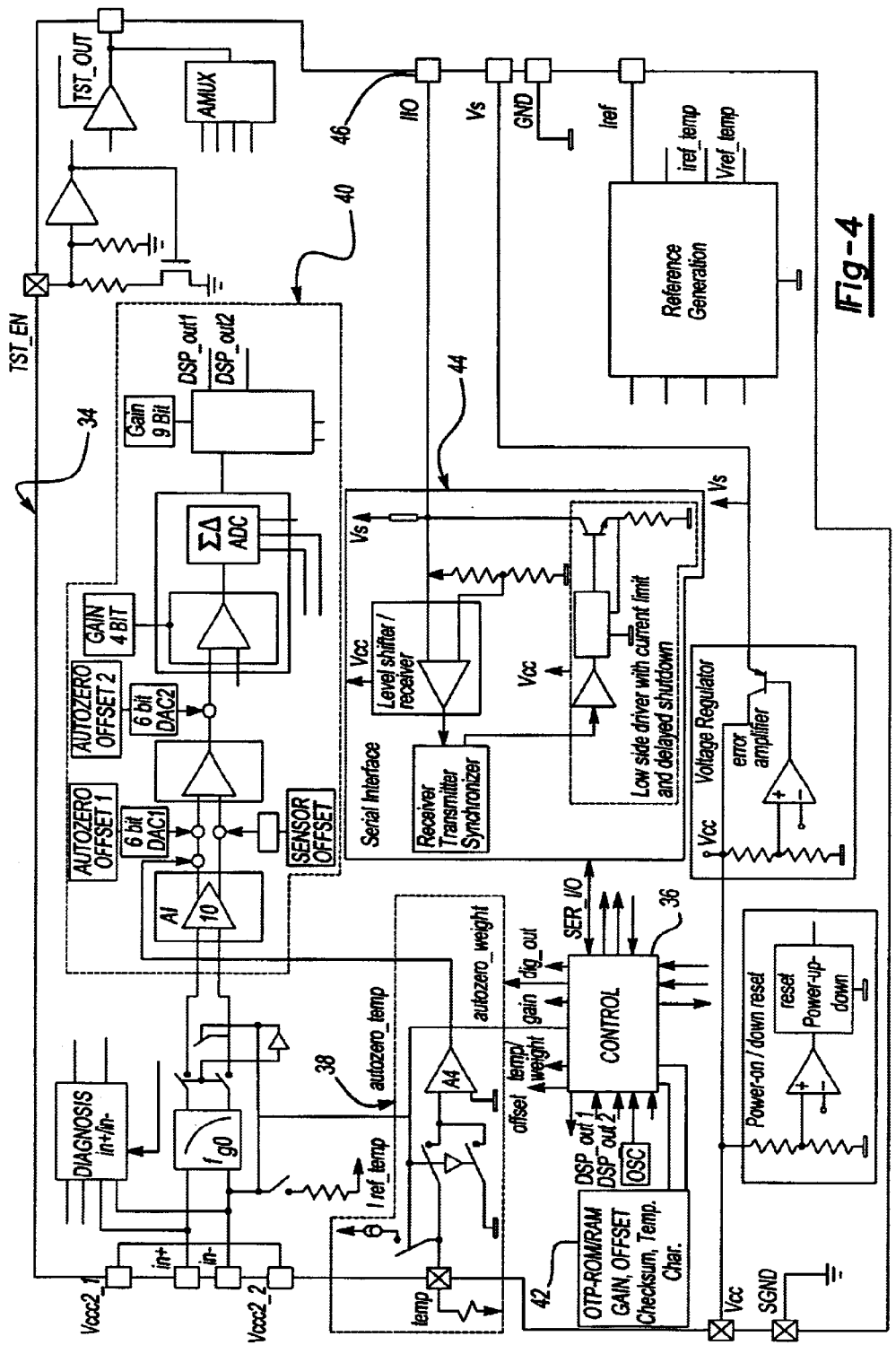
FIG. 4 schematically illustrates further details regarding selected portions of the embodiment of FIG. 3.

The signals from the sensors 32 preferably are propagated through an H bridge arrangement as shown in FIG. 3. In this example the bridge signal preferably is amplified and ultimately digitized to a pulse width modulated signal for transmission to the supplemental restraint controller 30. As seen in FIG. 4, an instrumentation amplifier provides amplification while a pulse width modulation converter provides digitization.

In addition to amplification, the strain gauge signal in the illustrated example preferably is calibrated for 2.5 volt mid scale offset, using a zero weight reference point. The strain gauge signal preferably is also compensated for a strain gauge bridge no-load offset shift over temperature. In addition, an analog switch for auto-zero cycle to correct for shifts and amplifier offset voltage due to temperature variations and over time drift preferably is included. In the illustrated example, the zero signal causes an internal solid state switch to short out instrumentation amplifier inputs.

In the illustrated example, an oscillator signal generator 50, which preferably is a saw tooth generator, provides for digitization of the analog sensor output signal. In the preferred embodiment, pulse width modulation is used to provide a digitized pulse width modulated output at 52, which is fed to the controller. 30. An example implementation of pulse width modulation for this purpose is described in U.S. patent application Ser. No. 09/651,714 which was filed on Aug. 31, 2000. The teachings of that application are incorporated into this specification by reference. Utilizing the pulse width modulation technique provides a digitized output that is superior to a simple analog to digital conversion. The typical microcontroller used within a weight classification system does not have adequate resolution to accurately make a weight determination based upon simply converting the analog sensor signal to a digital format.

This invention provides a way of compensating for one or more factors affecting the sensor output using analog circuitry techniques. The examples in the illustrated circuitry include temperature compensation and offset calibration.

Other factors, such as signal strength, which is typically very small from a strain gauge signal, are handled using digital circuitry techniques by digitizing the output. Using a combination approach (i.e., some analog, some digital) provides the ability to adequately compensate for the various factors affecting system performance. A purely digital approach or purely analog approach is inferior to the unique, combined approach of this invention.

The preceding description is exemplary rather than limiting in nature. Variations and modifications may become apparent to those skilled in the art that do not necessarily depart from the pursue or spirit of this invention. The scope of legal protection given to this invention can only be determined by studying the following claims.

We claim:

1. A method of compensating for various influences on a sensor signal that provides an indication of a weight of a seat occupant in a vehicle supplemental restraint system, comprising the steps of:

(A) identifying a plurality of factors that influence the sensor signal, wherein the factors include temperature, sensor offset, signal strength, signal spread, and vehicle seat parameters;

(B) processing the signal using analog signal processing to compensate for at least one of the factors including the sensor offset factor; and (C) processing the signal using digital signal processing to compensate for at least one other of the factors.

2. The method of claim 1, including compensating for the temperature factor using the analog signal processing.

3. The method of claim 1, including compensating for the signal strength using the digital signal processing.

4. A vehicle weight classification system, comprising:

a plurality of sensors that provide an electrical signal indicative of the weight of a seat occupant;

a signal conditioner associated with each sensor having a first portion that utilizes an analog signal to compensate for at least a sensor offset factor that iufluences the sensor signal and a second portion that utilizes a digital signal to compensate for at least one other factor that influences the sensor signal; and a controller that receives the conditioned signal and controls a supplemental restraint device.

5. The system of claim 4, wherein the signal conditioner first portion compensates for temperature influences on the sensor signal.

6. The system of claim 4, wherein the signal conditioner second portion compensates for signal strength.

* * * * *